(12) United States Patent
Kashu et al.

(10) Patent No.: US 7,006,822 B2
(45) Date of Patent: Feb. 28, 2006

(54) DISTANCE ALARM AND NOTIFICATION DEVICE FOR USE WITH MOBILE PHONE

(75) Inventors: Hiroomi Kashu, Moriguchi (JP); Shuji Otsuka, Hiagashiosaka (JP); Hideji Kawasaki, Neyagawa (JP)

(73) Assignee: Sanyo Electric Co., Ltd., Osaka (JP)

( * ) Notice: Subject to any disclaimer, the term of this patent is extended or adjusted under 35 U.S.C. 154(b) by 747 days.

(21) Appl. No.: 10/047,750

(22) Filed: Jan. 15, 2002

(65) Prior Publication Data
US 2002/0094784 A1 Jul. 18, 2002

(30) Foreign Application Priority Data
Jan. 16, 2001 (JP) .............................. 2001-008323

(51) Int. Cl.
*H04Q 7/20* (2006.01)
*H04M 11/00* (2006.01)

(52) U.S. Cl. ................ 455/421; 455/67.11; 455/404.2

(58) Field of Classification Search ............ 455/67.11, 455/421, 456.1, 404.1, 404.2, 41.2; 340/539.21, 340/539.23, 686.1, 571
See application file for complete search history.

(56) References Cited

U.S. PATENT DOCUMENTS

| | | | | |
|---|---|---|---|---|
| 6,006,115 A | * | 12/1999 | Wingate | .................. 455/575.2 |
| 6,013,007 A | * | 1/2000 | Root et al. | ..................... 482/8 |
| 6,151,493 A | * | 11/2000 | Sasakura et al. | ............ 455/421 |
| 6,198,390 B1 | * | 3/2001 | Schlager et al. | ............ 340/540 |
| 6,510,380 B1 | * | 1/2003 | Curatolo et al. | ............ 707/207 |

* cited by examiner

*Primary Examiner*—Marceau Milord
*Assistant Examiner*—Lewis West

(57) ABSTRACT

A mobile phone set including a mobile phone and a warning apparatus detects an electric field strength of a second electric wave transmitted from the mobile phone and the warning apparatus, and gives a warning sound and the like, which enables users to recognize the fact when the mobile phone is lost or stolen.

20 Claims, 13 Drawing Sheets

Fig.3A
EXAMPLE FOR SEQUENTIAL ORIGINAL DATA PIECES OF SECOND ELECTRIC WAVE DEMODULATED FROM THE SECOND ELECTRIC WAVE
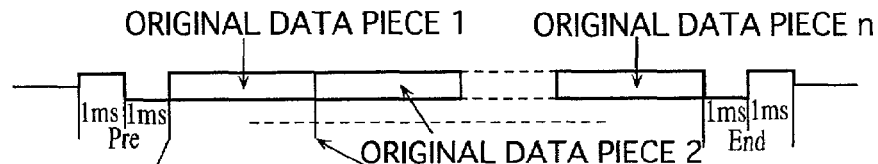
Fig.3B
STRUCTURE OF ORIGINAL DATA FOR SECOND ELECTRIC WAVE
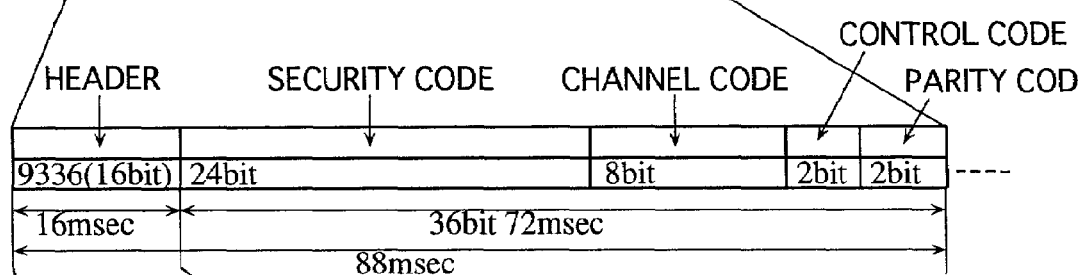
Fig.3C
BIT PATTERN
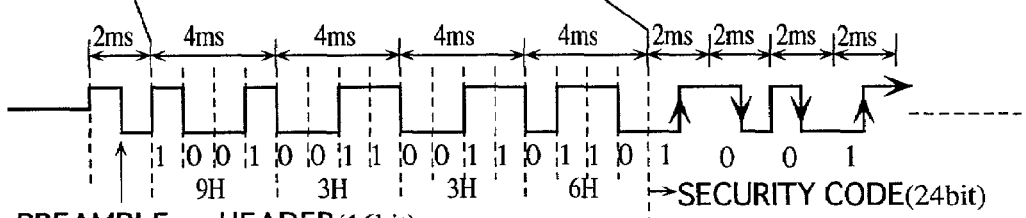
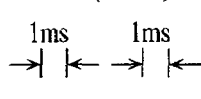
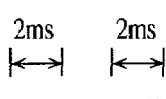

Fig.11A

| REGISTERED MOBILE PHONE NUMBER | TRANSACTION TO BE TAKEN | POSITION INFORMATION |
|---|---|---|
| 090-xxxx-xxxx | CALL 090-xxxx-○○○○ (VOICE GUIDANCE) | |
| 090-○○○○-○○○○ | ASK SECURITY STAFF TO GO TO SPECIFIED PLACE BY THE POSITION INFORMATION AND RETRIEVE MOBILE PHONE | |
| 090-△△△△-△△△△ | CONTACT TELEPHONE COMPANY TO STOP SERVICE (VOICE GUIDANCE) | |
| 090-□□□□-□□□□ | DISPLAY WHAT HAS HAPPENED ON DISPLAY UNIT | |

Fig.11B

| REGISTERED MOBILE PHONE NUMBER | TRANSACTION TO BE TAKEN | POSITION INFORMATION |
|---|---|---|
| 090-xxxx-xxxx | CALL 090-xxxx-○○○○ (VOICE GUIDANCE) | 35 DEGREES NORTH LATITUDE AND 128 DEGREES EAST LONGITUDE KYOTO PREF |
| 090-○○○○-○○○○ | ASK SECURITY STAFF TO GO TO SPECIFIED PLACE BY THE POSITION INFORMATION AND RETRIEVE MOBILE PHONE | 34 DEGREES NORTH LATITUDE AND 135 DEGREES EAST LONGITUDE OSAKA PREF |
| 090-△△△△-△△△△ | CONTACT TELEPHONE COMPANY TO STOP SERVICE (VOICE GUIDANCE) | 35 DEGREES NORTH LATITUDE AND 135 DEGREES EAST LONGITUDE KYOTO PREF |
| 090-□□□□-□□□□ | DISPLAY WHAT HAS HAPPENED ON DISPLAY UNIT | 36 DEGREES NORTH LATITUDE AND 128 DEGREES EAST LONGITUDE OSAKA PREF |

DISTANCE ALARM AND NOTIFICATION DEVICE FOR USE WITH MOBILE PHONE

BACKGROUND OF THE INVENTION (1) Field of the Invention

The present invention relates to a mobile phone set equipped with a protection function against loss and theft, and a mobile phone that constitutes the set.

(2) Related Art

Mobile phones have rapidly prevailed in recent years. Mobile phones, unlike regular phones, can be carried along, thereby enabling users to use phones when the users are moving. On the other hand, being regularly carried along, the mobile phones also have a drawback that they are vulnerable to loss and to theft.

So far, conventional mobile phones are not equipped with enough countermeasures against this drawback, which force users to pay special attention not to leave their phones behind, or to lose the phones.

SUMMARY OF THE INVENTION

The first object of the present invention, in view of the stated problems, is to provide a mobile phone set, a mobile phone constituting the set, and the mobile phone system.

In order to realize the above object, the present invention provides a mobile phone set having a mobile phone and a mobile warning apparatus, wherein the mobile phone transmits a specific electric wave addressed to the mobile warning apparatus, and the mobile warning apparatus includes: a measuring unit for measuring an electric field strength of the transmitted specific electric wave; a judging unit for judging whether the measured value of the electric field strength is smaller than a threshold value; and a warning unit for giving a warning when the judging unit judges that the measured value of the electric field strength is smaller than the threshold value (structure 1).

According to the structure 1, users can receive a warning by a warning sound, a vibration, a light emission or the like from a warning apparatus that the users are carrying along.

Here, the mobile warning apparatus may be in a form of a headphone (structure 2).

According to the structure 2, users can carry the mobile warning apparatus with them. Users accordingly are assured to receive the warning from the mobile phone apparatus when they lose the mobile phone.

Furthermore, the present invention may provide a mobile phone set including a mobile phone and a mobile warning apparatus, wherein the mobile warning apparatus transmits a specific electric wave addressed to the mobile phone, and the mobile phone includes: a storage unit for storing contact information of a predetermined party; a measuring unit for measuring an electric field strength of the transmitted specific electric wave; a judging unit for judging whether the measured value of the electric field strength is smaller than a threshold value; and a notifying unit for notifying the predetermined party when the judging unit judges that the measured value of the electric field strength is smaller than the threshold value (structure 3).

Or, the present invention may provide a mobile phone which receives a specific electric wave transmitted from a mobile warning apparatus, including: a storage unit for storing contact information of a predetermined party; a measuring unit for measuring an electric field strength of the transmitted specific electric wave; a judging unit for judging whether the measured value of the electric field strength is smaller than a threshold value; and a notifying unit for notifying the predetermined party when the judging unit judges that the measured value of the electric field strength is smaller than the threshold value (structure 4).

According to the structure 3 or 4, users can notify predetermined parties such as a security company. Therefore the predetermined parties can take an appropriate countermeasure.

Furthermore, in the structure 3, the mobile phone may further include: an acquiring unit for acquiring position information showing a position of the mobile phone; and the notifying unit notifies the predetermined party of the position information (structure 5).

Or, in the structure 4, the mobile phone may further include: an acquiring unit for acquiring position information showing a position of the mobile phone; and the notifying unit notifies the predetermined party of the position information(structure 6).

Or, the present invention may provide a mobile phone which receives a specific electric wave transmitted from a mobile warning apparatus, including: a storage unit for storing contact information of a predetermined party; an instruction receiving unit for receiving, from a user, a setting instruction for a first mode and a setting instruction for a second mode, each of the first and second modes having a threshold value for an electric field strength of the specific electric wave; a mode storage unit for storing, in correspondence, a mode which is set to be on by the user and the threshold value, a measuring unit for measuring the electric field strength for the specific electric wave; a first judging unit for judging, when the first mode is set to be on, whether the measured value of the electric field strength is smaller than the threshold value for the first mode; a second judging unit for judging, when the second mode is set to be on, whether the measured value of the electric field strength is smaller than the threshold value for the second mode; a notifying unit for notifying the predetermined party when the first judging unit judges that the measured value of the electric field strength is smaller than the threshold value; and a warning unit for giving a warning when second judging unit judges that the measured value of the electric field strength is smaller than the threshold value, further including: an acquiring unit for acquiring position information showing a position of the mobile phone; wherein the notifying unit notifies the predetermined party of the acquired position information by the acquiring unit (structure 7).

Or, the present invention may provide a mobile phone system including a reception apparatus located at a remote security company and the mobile phone which receives a specific electric wave and which is carried, by a user, with a mobile warning apparatus transmitting a specific electric wave to the mobile phone, the mobile phone including: a measuring unit for measuring an electric field strength of the specific electric wave; a judging unit for judging whether the measured value of the electric field strength is smaller than the threshold value; a notifying unit for notifying the reception apparatus, when the judging unit judges that the measured value of the electric field strength is smaller than the threshold value, and the reception apparatus including: a storage unit for storing, in correspondence, identification data identifying one or more mobile phones registered in the security company in advance and countermeasure data showing a countermeasure to be executed for each mobile phone; and a specifying unit for specifying the identification data of the mobile phone upon receiving the notification from the mobile phone, and for specifying countermeasure data which corresponds to the mobile phone by referring to the correspondence between the identification data and the countermeasure data, the mobile phone further including: an acquiring unit for acquiring position information showing a position of the mobile phone; wherein the notifying unit notifies the predetermined party of the acquired position information by the acquiring unit (structure 8).

According to the structure, when the user's mobile phone is lost or stolen, the predetermined parties such as their friend or the security company having a contract with the users are notified of the position information of the mobile phone. Accordingly the parties can know the location of the mobile phone.

Further, in the structure 5, the mobile phone may further include: an instruction receiving unit for receiving an operation instruction from a user, and a control providing unit for providing a control to invalidate the operation instruction from the user, when the judging unit judges that the measured value of the electric field strength is smaller than the threshold value (structure 9).

Or, in the structure 5, the storage unit may store a telephone number of a predetermined party and a warning message, and the notifying unit may include: an audio generating unit for reading the warning message from the storage unit, and generating audio data for the warning message and for the position information, according to the warning message and the position information acquired by the acquiring unit; a connecting unit for connecting the predetermined party by reading out the telephone number from the storage unit, and by calling the telephone number; and an audio outputting unit for outputting the audio data generated by the audio generating unit, wherein the mobile phone may further include: an instruction receiving unit for receiving an operation instruction from a user, and a control providing unit for providing a control to invalidate the operation instruction from the user, when the judging unit judges that the measured value of the electric field strength is smaller than the threshold value (structure 10).

Further, in the structure 5, the storage unit may store a mail address of the predetermined party and a warning message, and the notifying unit may include: a mail generating unit for reading the warning message, and generating first mail for informing the warning message, and second mail for informing the position information acquired by the acquiring unit; and a mail transmitting unit for reading the mail address and transmitting, to the mail address, the first mail and the second mail, the mobile phone further including: an instruction receiving unit for receiving an operation instruction from a user, and a control providing unit for providing a control to invalidate the operation instruction from the user, when the judging unit judges that the measured value of the electric field strength is smaller than the threshold value (structure 11).

Or, the present invention may provide a mobile phone set including a mobile phone and a mobile warning apparatus, wherein the mobile warning apparatus transmits a specific electric wave addressed to the mobile warning phone, and the mobile warning apparatus includes: an instruction receiving unit for receiving an operation instruction from a user; a measuring unit for measuring an electric field strength of the transmitted specific electric wave; a judging unit for judging whether the measured value of the electric field strength is smaller than a threshold value; and a control providing unit for providing a control to invalidate the operation instruction from the user, when the judging unit judges that the measured value of the electric field strength is smaller than the threshold value (structure 12).

Or, the mobile phone of the structure 6 may further include: an instruction receiving unit for receiving an operation instruction from a user, and a control providing unit for providing a control to invalidate the operation instruction from the user, when the judging unit judges that the measured value of the electric field strength is smaller than the threshold value (structure 13).

Or, the present invention may have the structure 6, wherein the storage unit stores a telephone number of a predetermined party and a warning message, and the notifying unit includes: an audio generating unit for reading the warning message from the storage unit, and generating audio data for the warning message and for the position information, according to the warning message and the position information acquired by the acquiring unit; a connecting unit for connecting the predetermined party by reading out the telephone number from the storage unit, and by calling the telephone number; and an audio outputting unit for outputting the audio data generated by the audio generating unit, and the mobile phone further includes: an instruction receiving unit for receiving an operation instruction from a user, and a control providing unit for providing a control to invalidate the operation instruction from the user, when the judging unit judges that the measured value of the electric field strength is smaller than the threshold value (structure 14).

Or, the present invention may have the structure 6, wherein the storage unit stores a mail address of the predetermined party and a warning message, and the notifying unit includes: a mail generating unit for reading the warning message, and generating first mail for informing the warning message, and second mail for informing the position information acquired by the acquiring unit; a mail transmitting unit for reading the mail address and transmitting, to the mail address, the first mail and the second mail, and the mobile phone further includes: an instruction receiving unit for receiving an operation instruction from a user, and a control providing unit for providing a control to invalidate the operation instruction from the user, when the judging unit judges that the measured value of the electric field strength is smaller than the threshold value (structure 15).

The present invention may also provide a mobile phone which receives a specific electric wave transmitted from a mobile warning apparatus, including: an instruction receiving unit for receiving an operation instruction from a user; a measuring unit for measuring an electric field strength of the transmitted specific electric wave; a judging unit for judging whether the measured value of the electric field strength is smaller than a threshold value; and a control providing unit for providing a control to invalidate the operation instruction from the user, when the judging unit judges that the measured value of the electric field strength is smaller than the threshold value (structure 16).

The present invention also provide the structure 8, wherein the mobile phone further includes: an instruction receiving unit for receiving an operation instruction from a user, and a control providing unit for providing a control to invalidate the operation instruction from the user, when the judging unit judges that the measured value of the electric field strength is smaller than the threshold value. (structure 17).

According to any one of the structures 9–17, users, when a loss or a theft of their phone happens, can prevent people who have found the phone or the robber from abusing the phone.

Further, in the structure 9, the instruction receiving unit may further receive a personal identification number inputted by the user, and the control providing unit may include a control canceling unit for canceling the control upon receiving the personal identification number (structure 18).

Or, in the structure 10, the instruction receiving unit may further receive a personal identification number inputted by the user, and the control providing unit may include a control canceling unit for canceling the control upon receiving the personal identification number (structure 19).

Moreover, in the structure 11, the instruction receiving unit may further receive a personal identification number inputted by the user, and the control providing unit may include a control canceling unit for canceling the control upon receiving the personal identification number (structure 20).

Or, in the structure 12, the instruction receiving unit may further receive a personal identification number inputted by the user, and the control providing unit may include a control canceling unit for canceling the control upon receiving the personal identification number (structure 21).

Or, in the structure 13, the instruction receiving unit may further receive a personal identification number inputted by the user, and the control providing unit may include a control canceling unit for canceling the control upon receiving the personal identification number (structure 22).

Or, in the structure 14, the instruction receiving unit may further receive a personal identification number inputted by the user, and the control providing unit may include a control canceling unit for canceling the control upon receiving the personal identification number (structure 23).

Or, in the structure 15, the instruction receiving unit may further receive a personal identification number inputted by the user, and the control providing unit may include a control canceling unit for canceling the control upon receiving the personal identification number (structure 24).

Or in the structure 16, the instruction receiving unit may further receive a personal identification number inputted by the user, and the control providing unit may include a control canceling unit for canceling the control upon receiving the personal identification number (structure 25).

Or, in the structure 17, the instruction receiving unit may further receive a personal identification number inputted by the user, and the control providing unit may include a control canceling unit for canceling the control upon receiving the personal identification number (structure 26).

According to any one of the structures 18–26, users, when the lost or stolen mobile phone is returned to them, can recover its function by canceling the control of the mobile phone by inputting personal identification number stored in the mobile phone in advance.

Furthermore, in the structure 5, the storage unit may store a telephone number of a predetermined party and a warning message, and the notifying unit may include: an audio generating unit for reading the warning message from the storage unit, and generating audio data for the warning message and for the position information, according to the warning message and the position information acquired by the acquiring unit; a connecting unit for connecting the predetermined party by reading out the telephone number from the storage unit, and by calling the telephone number; and an audio outputting unit for outputting the audio data generated by the audio generating unit (structure 27).

Or, in the structure 5, the storage unit may store a mail address of the predetermined party and a warning message, and the notifying unit may include: a mail generating unit for reading the warning message, and generating first mail for informing the warning message, and second mail for informing the position information acquired by the acquiring unit; and a mail transmitting unit for reading the mail address and transmitting, to the mail address, the first mail and the second mail(structure 28).

Or, in the structure 6, the storage unit may store a telephone number of a predetermined party and a warning message, and the notifying unit may include: an audio generating unit for reading the warning message from the storage unit, and generating audio data for the warning message and for the position information, according to the warning message and the position information acquired by the acquiring unit; a connecting unit for connecting the predetermined party by reading out the telephone number from the storage unit, and by calling the telephone number; and an audio outputting unit for outputting the audio data generated by the audio generating unit (structure 29).

Or, in the structure 6, the storage unit may store a mail address of the predetermined party and a warning message, and the notifying unit may include: a mail generating unit for reading the warning message, and generating first mail for informing the warning message, and second mail for informing the position information acquired by the acquiring unit; a mail transmitting unit for reading the mail address and transmitting, to the mail address, the first mail and the second mail (structure 30).

According to any one of the structures 27–30, users can notify, their home, their friend's house, or the security company under contract with the users, of the fact that the mobile phone is lost, and of the position information of the mobile phone, by sending a message. Therefore, the recipient of the message can know the detailed information about the situation, and can take appropriate countermeasure for retrieving the mobile phone.

Further, the present invention may also provide a mobile phone which receives a specific electric wave transmitted from a mobile warning apparatus, including: a storage unit for storing contact information of a predetermined party; an instruction receiving unit for receiving, from a user, a setting instruction for a first mode and a setting instruction for a second mode, each of the first and second modes having a threshold value for an electric field strength of the specific electric wave; a mode storage unit for storing, in correspondence, a mode which is set to be on by the user and the threshold value, a measuring unit for measuring the electric field strength for the specific electric wave; a first judging unit for judging, when the first mode is set to be on, whether the measured value of the electric field strength is smaller than the threshold value for the first mode; a second judging unit for judging, when the second mode is set to be on, whether the measured value of the electric field strength is smaller than the threshold value for the second mode; a notifying unit for notifying the predetermined party when the first judging unit judges that the measured value of the electric field strength is smaller than the threshold value; and a warning unit for giving a warning when second judging unit judges that the measured value of the electric field strength is smaller than the threshold value (structure 31).

According to the structure 31, users can select an appropriate countermeasure when their mobile phone is lost or stolen.

In addition, the present invention may also have a mobile phone system including a reception apparatus located at a remote security company and the mobile phone which receives a specific electric wave and which is carried, by a user, with a mobile warning apparatus transmitting a specific electric wave to the mobile phone, the mobile phone including: a measuring unit for measuring an electric field strength of the specific electric wave; a judging unit for judging whether the measured value of the electric field strength is smaller than the threshold value; a notifying unit for notifying the reception apparatus, when the judging unit judges that the measured value of the electric field strength is smaller than the threshold value, and the reception apparatus including: a storage unit for storing, in correspondence, identification data identifying one or more mobile phones registered in the security company in advance and countermeasure data showing a countermeasure to be executed for each mobile phone; and a specifying unit for specifying the identification data of the mobile phone upon receiving the notification from the mobile phone, and for specifying countermeasure data which corresponds to the mobile phone by referring to the correspondence between the identification data and the countermeasure data (structure 32).

According to the structure 32, countermeasures to the loss or the theft will be taken without delay by the security company.

BRIEF DESCRIPTION OF THE DRAWINGS

These and other objects, advantages and features of the invention will become apparent from the following description thereof taken in conjunction with the accompanying drawings that illustrate a specific embodiment of the invention. In the drawings:

FIG. 3A shows an example of a plurality of sequential original data pieces for a second electric wave;

FIG. 3B shows a structure of original data of a second electric wave demodulated from the second electric wave;

FIG. 3C shows a bit pattern for each of a header and a security code;

FIG. 4 is a flow chart for showing the transaction that the control unit 14 performs when both the "loss" and the "theft" modes are on;

FIG. 5 is a flow chart showing the transaction that the control unit 71 performs when both the "loss" and the "theft" modes are on;

FIG. 6 is a flow chart showing the transaction that the control unit 14 performs when only the "loss" mode is on;

FIG. 7 is a flow chart showing the transaction that the control unit 71 performs when only the "loss" mode is on;

FIG. 8 is a flow chart showing the transaction that the control unit 14 performs when only the "theft" mode is on;

FIG. 9 is a flow chart showing the transaction that the control unit 71 performs when only the "theft" mode is on;

FIG. 11A is an example table stored in the memory 99;

FIG. 11B is an example table stored in the memory 99 after the position information is stored therein;

DESCRIPTION OF THE PREFERRED EMBODIMENTS

The mobile phone set, according to the embodiment of the present invention, is comprised of a mobile phone and a mobile warning apparatus. The warning apparatus is a small apparatus which is carried along with the mobile phone by the owner, and which prevents the mobile phone from being lost. The mobile phone and its warning apparatus receive and transmit electric waves with a certain frequency level (hereafter referred to as "second electric wave" in order to distinguish from first waves that are electric waves designated for carrying audio signals used for communication that will be mentioned in the later section). The mobile phone and the warning apparatus communicate each other by identifying a particular bit pattern included in the second electric wave. The mobile phone and its warning apparatus monitor the distance between the both by measuring the electric field strength of the second electric wave, and if the distance is over the predetermined level such as more than 2 to 3 meters, the mobile phone and the warning apparatus give a warning sound and the like.

Specifically, the mobile phone and its warning apparatus demodulates the received second wave into data, judges whether its bit pattern matches a particular pattern, identifies the received wave to be the wave from the counterpart (i.e. the warning apparatus or the mobile phone) if the bit pattern is judged to match, and measures the electric field strength of the identified second electric wave. If the measured value is judged to be lower than a predetermined value, notifies by giving a warning sound for example. Hereafter, the above mentioned predetermined value is called "threshold value."

Figure 1:
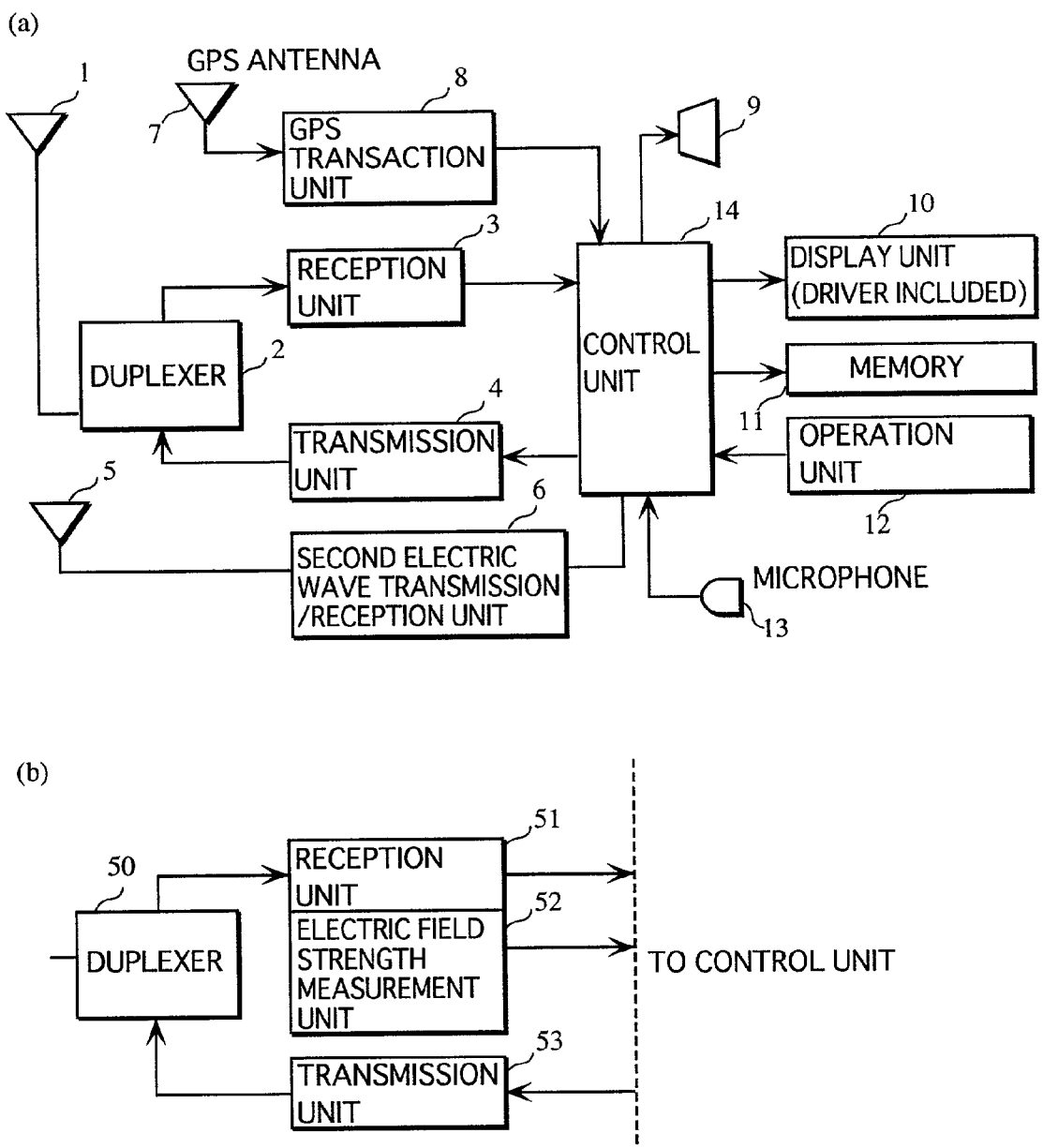
FIG. 1A is a block diagram showing a structure of a mobile phone 20.
FIG. 1B is a block diagram showing a structure of a second electric wave transmission/reception unit 6.

FIG. 1A is a block diagram showing a structure of a mobile phone 20 according to the embodiment of the present invention. The mobile phone 20 includes an antenna 1, a duplexer 2, a reception unit 3, a transmission unit 4, a memory 11, an operation unit 12, a microphone 13, a GPS antenna 7, a GPS transaction unit 8, an antenna 5, a second electric wave transmission/reception unit 6, a control unit 14, a speaker 9, and a display unit 10.

The antenna 1 transmits/receives first electric waves that are used to carry audio signals for telephone conversation. The duplexer 2 switches between transmission and reception performed by the antenna 1. The reception unit 3 demodulates a first electric wave received through the antenna 1 into data, and outputs the data to the control unit 14.

The transmission unit 4 modulates the transmission data outputted from the control unit 14 into transmission signals, and outputs the modulated transmission signals to the antenna 1 through the duplexer 2. The speaker 9 converts the outputted audio signal from the control unit 14 into audio and then outputs the audio. The display unit 10 displays characters, symbols, and the like upon receiving an instruction from the control unit 14.

The memory 11 stores warning audio data, warning mode data, data of predetermined parties, warning message data, transmission data and so on.

The warning audio data consists of two kinds of original data (hereafter respectively referred to as "warning audio data P," and "warning audio data Q,") for giving warning sounds. The control unit 14 reads out the warning audio data P and Q, converts them into an audio signal, and outputs the audio signal to the speaker 9.

The warning mode data consists of an identifier for identifying a warning mode (hereafter "mode identifier"), data showing a threshold value for the electric field strength for the corresponding mode, and instruction data which shows instruction on whether the mode is on or off. There are two modes; "loss" and "theft", and a threshold value is set for each mode. For example, if a mode identifier shows the "loss" mode, a threshold value A is set which corresponds to the value of the electric field strength shown when the distance between the mobile phone 20 and the warning apparatus is 2 to 3 meters, and for the "theft" mode, a threshold value B is set which corresponds to the value of the electric field strength shown when the distance is approximately 10 meters.

The data of the predetermined parties is data showing contact information such as telephone numbers and mail addresses where the parties can be reached. Here, the predetermined parties are not restricted to those having contract with the security company but can include those specified by the user in advance, such as home of the owner of the mobile phone, office, and the owner's friend's house.

The warning message data is original data for giving a voice message notifying "there is a possibility that the mobile phone is lost or stolen."

The transmission data is data transmitted either by the mobile phone 20 or by its warning apparatus to the other end (i.e. the warning apparatus or the mobile phone 20), through the second electric wave. The transmission data consists of a security code, a channel code, and a control code.

The security code is data used for specifying the sender of the transmission data (i.e. the mobile phone 20 or its warning apparatus), and specifically it is data represented by a specific bit pattern.

The channel code is data showing frequency of the second electric wave that the sender sent.

The control code is data for instructing whether the warning sound should be on/off which is given by the warning apparatus or by the mobile phone 20, and is to be set according to the user instruction.

When the control code is set to be on, a warning sound is given when having judged that the detected electric field strength is below the predetermined threshold value for each mode identifier, "loss", and "theft", respectively (hereafter, the description bases the assumption that for the "loss" mode, "threshold value A" is assigned, and for the "theft" mode, "threshold value B" is assigned, in advance). If the control code is set to be off, no warning sound is given in either mode.

The operation unit 12 receives a user instruction on whether the warning mode (i.e. each of the "loss" or "theft" modes shown by the mode identifier) should be on or off, and on whether the warning sound should be on or off. Then the operation unit 12 outputs the inputted instruction to the control unit 14. The microphone 13 outputs a detected sound to the control unit 14.

The GPS antenna 7 receives, from several satellites, an electric wave that includes position information (the electric waves being in the size of some GHz, hereafter referred to as "third electric wave").

The GPS transaction unit 8 detects current position information from the third electric wave received through the GPS antenna 7, and outputs the detected current position information to the control unit 14. The antenna 5 transmits/receives second electric waves.

Next, the second electric wave transmission/reception unit 6 is described. FIG. 1B is a block diagram showing the structure of the second electric wave transmission/reception unit 6. The second electric wave transmission/reception unit 6 includes a duplexer 50, a reception unit 51, a transmission unit 53, and an electric field strength measurement unit 52.

The duplexer 50 switches between transmission and reception of the antenna 5. The reception unit 51 demodulates the second electric wave received through the antenna 5 into original data of the second electric wave which will be mentioned in the later section, and outputs the original data to the control unit 14. The transmission unit 53 modulates the original data into a second electric wave, and outputs the second electric wave, through the duplexer 50, to the antenna 5. The electric field strength measurement unit 52 measures the electric field strength of the second electric wave, and outputs the measured value to the control unit 14.

The control unit 14 converts the first electric wave outputted from the reception unit 3 into an audio signal, and outputs the audio signal to the speaker 9. The control unit 14 records a user instruction on whether the warning mode is set to be on or off, in the memory 11, as instruction data on the warning mode data. The control unit 14 also records a user instruction on whether the warning sound of the warning apparatus is set to be on or off in the memory 11 as a control code of transmission data.

Then the control unit 14 reads out the transmission data from the memory 11, generates original data of a second electric wave by adding a header and a parity code to the transmission data, and outputs the original data to the transmission unit 53. Here, the header is data showing a type of the mobile phone, and the parity code is data used to check for a data error.

In addition, the control unit 14 reads a bit pattern of the security code included in the transmission data which is included in the original data of the second electric wave. The control unit 14 then judges whether the data is sent from the warning apparatus for the mobile phone 20, receives the measured value of the electric field strength outputted from the electric field measurement unit 52, and finally judges whether the measured value of the electric field strength is no smaller than the predetermined threshold value which was set in advance.

The control unit 14, when it judges that the measured value of the electric field strength is smaller than the threshold value (i.e. the threshold value A when only the loss mode is set to be on, the threshold value B when only the theft mode is on, and the threshold value A or the threshold value B when both of the modes are set to be on), reads out, from the memory 11, the warning audio data (i.e. the warning audio data P for the measured value of the electric field strength being smaller than the threshold value B, and the warning audio data Q for the measured value of the electric field strength being smaller than the threshold value A), converts the warning audio data into an audio signal, outputs the audio signal to the speaker 9. If the measured value is smaller than the threshold value B, the control unit 14 further reads out the data on the predetermined parties and the warning message data, acquires position information outputted from the GPS transaction unit 8, and finally transmits the warning message and the position information to the predetermined parties.

Figure 2:
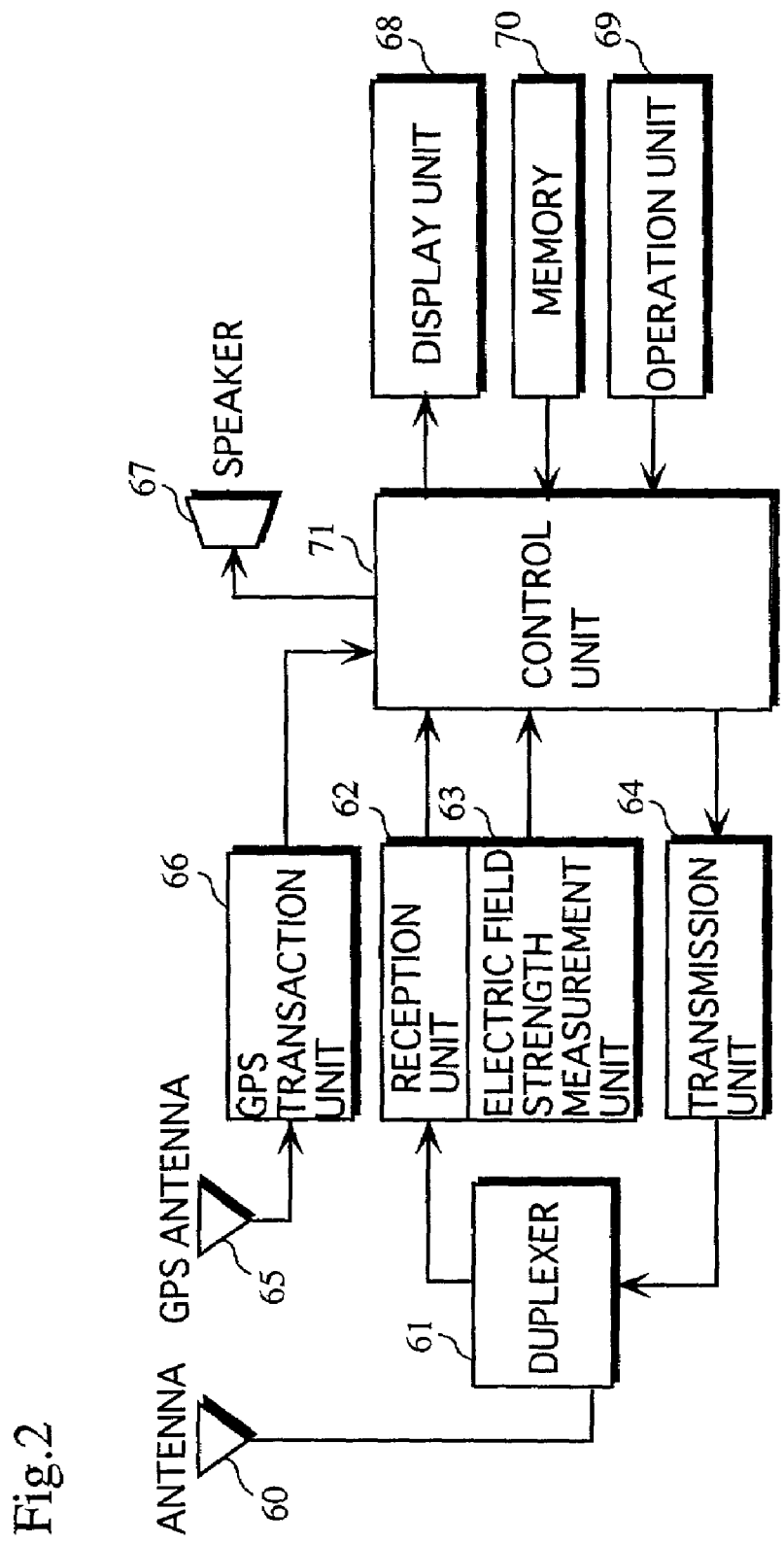
FIG. 2 is a block diagram showing a structure of a warning apparatus 21.

FIG. 2 is a block diagram showing the structure of a warning apparatus 21 according to the embodiment of the present invention. The warning apparatus 21 includes an antenna 60, a duplexer 61, a reception unit 62, an electric field strength measurement unit 63, a transmission unit 64, a GPS antenna 65, a GPS transaction unit 66, a speaker 67, a display unit 68, an operation unit 69, a memory 70, and a control unit 71. The warning apparatus 21 is equipped inside an audio amplifying apparatus in such forms as a pair of headphones, for example.

The antenna 60 transmits and receives second electric waves. The duplexer 61 switches between transmission and reception of the antenna 60.

The reception unit 62 demodulates the second electric wave received through the antenna 60 into original data of a second electricwave, and outputs the original data to the control unit 71. The electric field strength measurement unit 63 measures the electric field strength of the second electric wave, and outputs the measured value to the control unit 71. The transmission unit 64 modulates the original data of the second electric wave into a second electric wave, and outputs the second electric wave to the antenna 60 through the duplexer 61.

The GPS antenna 65 receives, from several satellites, a third electric wave, that includes position information. The GPS transaction unit 66 detects the current position information from the received third electric wave, and outputs the detected current position information to the control unit 71.

The speaker 67 converts audio signals outputted from the control unit 71 into audio, and outputs the audio. The display unit 68 displays characters and symbols, and the like, according to instructions from the control unit 71. The operation unit 69 receives a user instruction on whether the warning mode for the warning apparatus (i.e. each of the "loss" and "theft" modes shown by the mode identifier) should be on or off, and a user instruction on whether the warning sound for the mobile phone 20 should be on or off, and outputs the inputted instructions to the control unit 71.

The memory 70 stores warning apparatus warning audio data, warning apparatus warning mode data, transmission data, and the like. The warning apparatus warning audio data consists of two kinds of original data for giving a warning sound (hereafter referred to as warning audio data R, and warning audio data S respectively).

The control unit 71 records, on the memory 70, user instructions on whether the warning apparatus warning mode should be on or off, and on whether the warning sound for the mobile phone 20 should be on or off, both being outputted by the operation unit 69.

Specifically, the control unit 71 records the user instruction on whether the warning apparatus warning mode should be on or off, on the memory 70, as instruction data for the warning apparatus warning mode data, and the user instruction on whether the warning sound for the mobile phone 20 should be on or off, also on the memory 70, as a control code for the transmission data.

The control unit 71 reads the transmission data from the memory 70, generates original data for a second electric wave by adding a header and a parity code to the transmission data, and outputs the original data to the transmission unit 64.

The control unit 71 reads a bit pattern of the security code included in the transmission data for the original data for the second electric wave, judges whether the data is sent from the mobile phone 20, receives the measured value of the electric field strength outputted from the electric field strength measurement unit 63, and judges whether the measured value of the electric field strength is no smaller than the threshold value which was set in advance.

The control unit 71, when it judges that the measured value of the electric field strength is smaller than the threshold value (i.e. the threshold value A when only the loss mode is on, the threshold value B when only the theft mode is on, and A or B when both of the modes are on), reads out the warning audio data (i.e. warning audio data P when the measured value of the electric field strength is smaller than the threshold value B, and warning audio data Q when the measured value of the electric field strength is smaller than the threshold value A), converts the read warning audio data into an audio signal, and outputs the audio signal to the speaker 67.

FIG. 3A shows an example of the plurality of sequential original data pieces demodulated from a second electric wave (hereafter "original data"). As FIG. 3A shows, the first part of sequential original data pieces includes a preamble for showing the beginning of original data. And the end of the sequential original data pieces includes an end code showing the end of transmission data. FIG. 3B shows a structure of original data of a second electric wave demodulated from the second electric wave. Original data consists of a header, a security code, a channel code, a control code, and a parity code.

The header is data showing a type of a mobile phone. As FIG. 3C shows, 1 header consists of 16 bit symbols with time lengths of 16 mS, where 1 bit symbol has a time length of 1 mS, and H and L signify 1 and 0 respectively. If the header has a fixed bit pattern, which shows "1001001100110110," then each of the control unit 14 for the mobile phone 20 and the control unit 71 for the warning apparatus 21 reads the data that follows the header, if the header does not have the fixed bit pattern, then neither the control unit 14 or the control unit 71 reads the data that follows the header. By this operation, it is judged whether the data is sent from the same type of mobile phone or not.

The security code is data for verifying that the sender of the original data is either the mobile phone 20 or the warning apparatus 21. As FIG. 3C shows, 1 security code consists of 24 bit symbols with time lengths of 48 mS, where one bit symbol has time lengths of 2 mS, and a leading edge and a trailing edge are 1 and 0 respectively. Each of the control unit 14 for the mobile phone 20 and the control unit 71 for the warning apparatus 21 respectively judges whether the bit pattern of the security code matches that of themselves. If they are judged to match, then each control unit recognizes that the sender is the mobile phone 20 or the warning apparatus 21 that they are to communicate.

The channel code is data showing a frequency of a second electric wave sent from a sender. 1 channel code consists of 8 bit symbols with time lengths of 16 mS, where one bit symbol has time lengths of 2 mS, and a leading edge and a trailing edge are 1 and 0 respectively.

The control code is data for instructing whether the warning sounds should be on or off for the mobile phone 20 and for the warning apparatus 21. 1 control code consists of 2 bit symbols with time lengths of 4 mS, where one bit symbol has time lengths of 2 mS, and a leading edge and a trailing edge is 1 and 0 respectively.

The parity code is data for checking any data errors. 1 parity code consists of 2 bit symbols with time lengths of 4 mS, where one bit symbol has time lengths of 2 mS, and a leading edge and a trailing edge are 1 and 0 respectively.

Next, the transaction that the control unit 14 for the mobile phone 20 and the control unit 71 for the warning apparatus 21 perform will be described for each selected warning mode: (1) both the loss and theft modes are on, (2) only the loss mode is on, (3) only the theft mode is on. Note that in the description, it is assumed that the warning sound is set to be on for both of the mobile phone 20 and for the warning apparatus 21.

Figure 4:
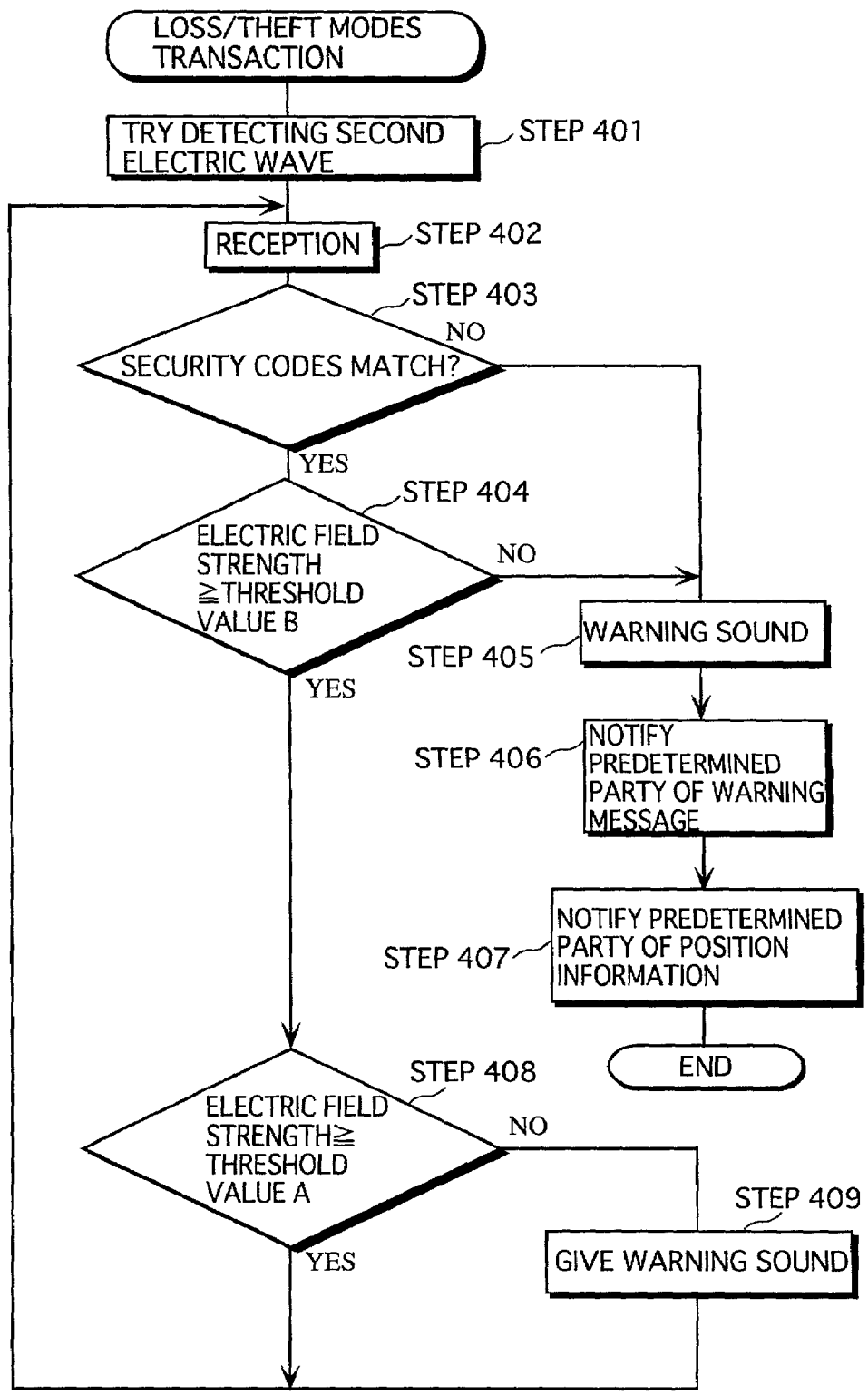

FIG. 4 is a flow chart for showing the transaction that the control unit 14 performs in case of (1) mentioned above. The reception unit 51 attempts, at regular intervals such as 10 seconds for example, to detect a second electric wave through the antenna 5 (step S401). The reception unit 51, having detected a second electric wave, receives the detected second electric wave (step S402), and demodulates the received second electric wave into original data for a second electric wave, and outputs the original data to the control unit 14.

The control unit 14 reads the bit pattern of the original data for the second electric wave outputted from the reception unit 51, and judges whether the bit pattern matches that of the security code for the transmission data stored in the memory 11 (step S403).

When the two bit patterns are judged to match (step S403:Y), the control unit 14 reads the threshold value B that corresponds to the theft mode, and judges whether the measured value of the electric field strength outputted from the electric field strength measurement unit 52 is no smaller than B (step S404).

When the measured value of the electric field strength is judged to be smaller than B (step S404:N), or when the two bit patterns did not match (step S403:N), the control unit 14 reads out the warning audio data P from the memory 11, converts the data into an audio signal, outputs the audio signal to the speaker 9. Then the speaker 9 converts the audio signal into the warning sound P, and gives a warning sound (step S405). Further, the control unit 14 reads out, from the memory 11, the data of the predetermined parties and the warning message data, calls the phone numbers that are on the list, converts the warning message data into an audio signal, outputs the audio signal to the speaker 9, and provides the predetermined parties a warning message, by outputting a warning message informing that "there is a possibility that the mobile phone is lost or stolen" from the speaker 9 (step S406).

Further, the control unit 14 acquires position information of the mobile phone 20 from the GPS transaction unit 8, converts the acquired position information into an audio signal, and provides the predetermined parties position information by outputting audio that notifies of the acquired position information from the speaker 9 (step S407).

When the measured value of the electric field strength is judged to be no smaller than B (step S404:Y), the control unit 14 reads, from the memory 11, the threshold value A corresponding to the loss mode, and judges whether the measured value of the electric field strength outputted from the electric field strength measurement unit 52 is no smaller than A (step S408).

When the measured value of the electric field strength is judged to be smaller than A (step S408:N), the control unit 14 reads out the warning audio data Q from the memory 11, converts the data into an audio signal, outputs the audio signal to the speaker 9. The speaker 9 gives converts the audio signal into the warning sound Q and gives a warning sound(step S409).

The measured value of the electric field strength is judged to be no smaller than A (step S408:Y), the control unit 14 repeats the transaction from step S401 and step S408.

Figure 5:
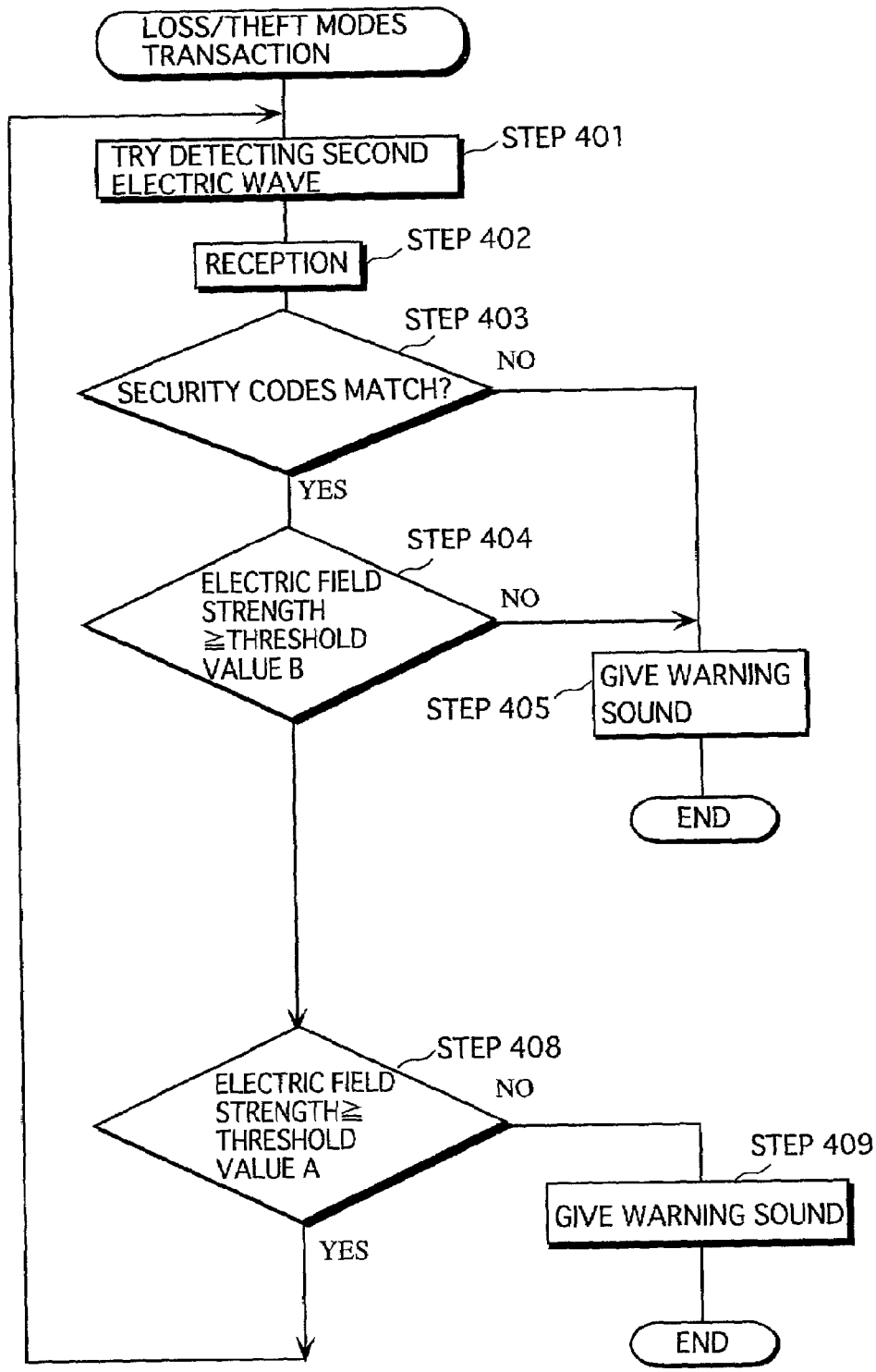

So far the description was about the transaction that the control unit 14 performs when both the loss mode and the theft mode are on. The transaction that the control unit 71 performs is mostly the same as the transaction that the control unit 14 performs (S401–S409); except that the control unit 71 does not perform steps S406 and S407. To be exact, the following replacement is required for the control unit 71: the reception unit 51 with the reception unit 62; the warning apparatus 21 with the mobile phone 20; the memory 11 with the memory 70; the speaker 9 with the speaker 67; the electric field strength measurement unit 52 with the electric field strength measurement unit 63; the warning sound P with the warning sound R; and the warning sound Q with the warning sound S. FIG. 5 is a flow chart showing the transaction that the control unit 71 performs when both of the loss mode and the theft mode are on. To facilitate understanding, the same step numbers are used for the control unit 71 as the corresponding steps for the control unit 14 shown in FIG. 4.

Figure 6:
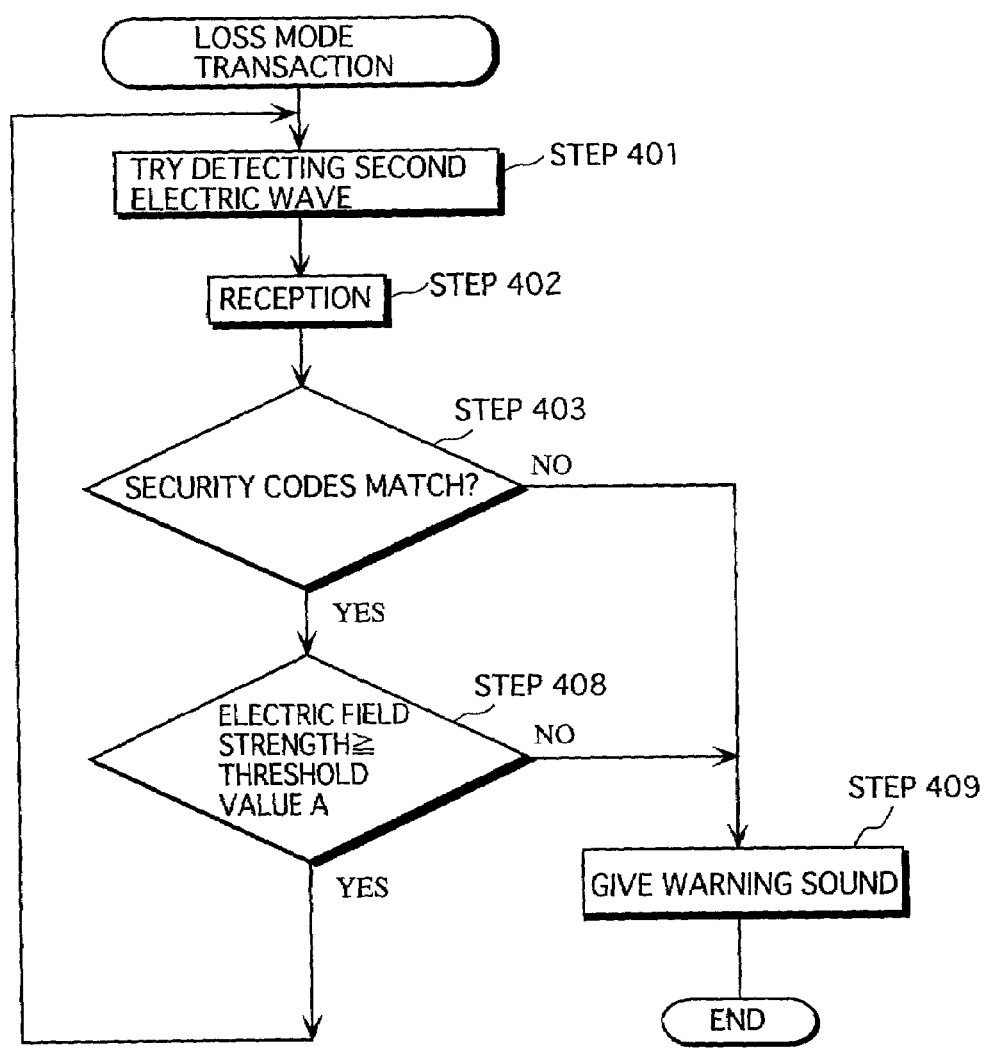
Figure 7:
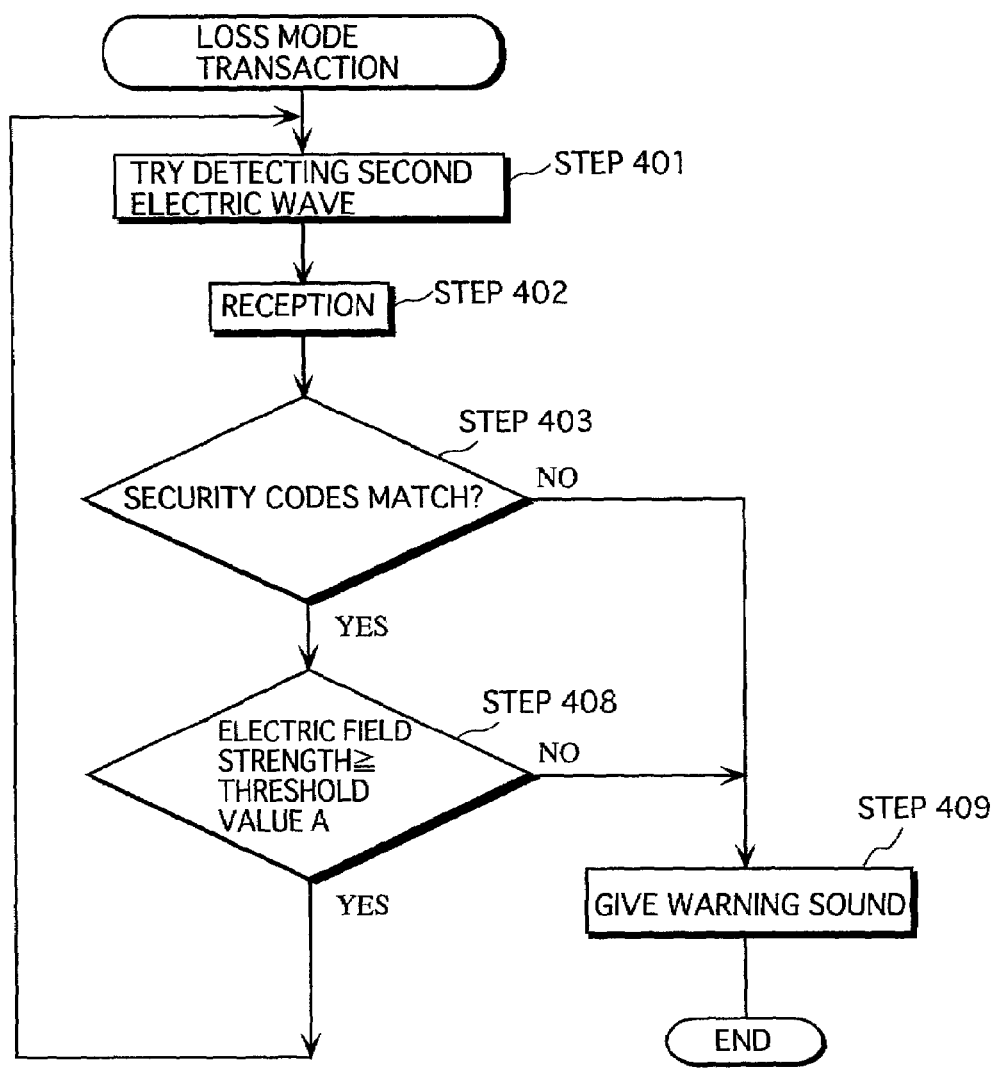

Next, the transaction performed by the control unit 14 is described, when only the loss mode is on. FIG. 6 is a flow chart showing the transaction performed by the control unit 14 in such a case. The description is omitted for the steps S401–403, S408–409 in FIG. 6, since they are already described with reference to FIG. 4. The description of the transaction that the control unit 71 performs is also omitted since it is the same as the transaction that the control unit 14 performs (i.e. steps S401–s403 and s408–s409), except that the following replacement is required: the reception unit 51 with the reception unit 62; the warning apparatus 21 with the mobile phone 20; the memory 11 with the memory 70; the speaker 9 with the speaker 67; the electric field strength measurement unit 52 with the electric field strength measurement unit 63; and the warning sound Q with the warning sound S. FIG. 7 is a flow chart showing a transaction that the control unit 71 performs when only the loss mode is on. To facilitate understanding, the same step numbers are used in the flow chart showing the transaction of the control unit 71 as the corresponding steps for the control unit 14 shown in FIG. 6.

Figure 8:
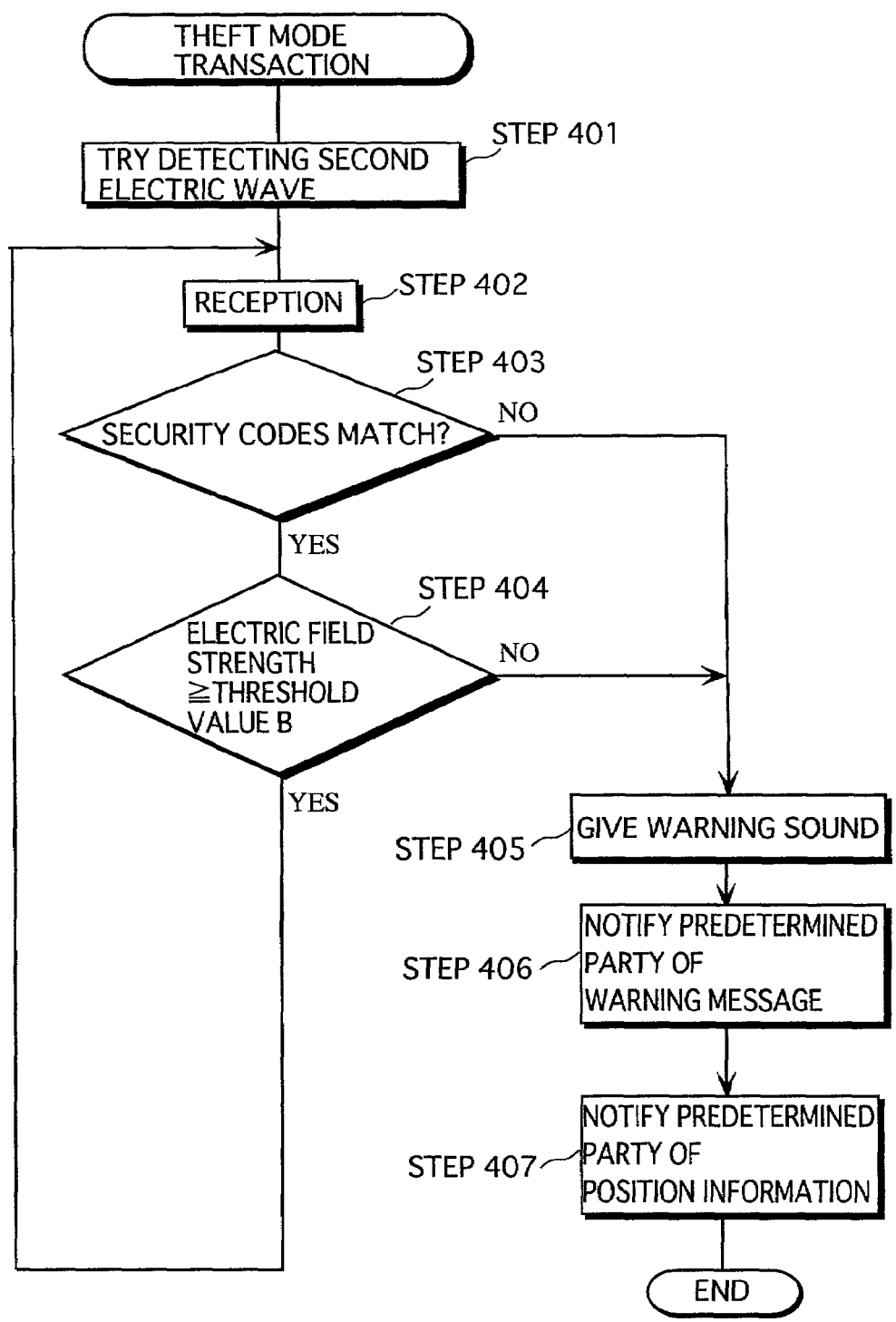
Figure 9:
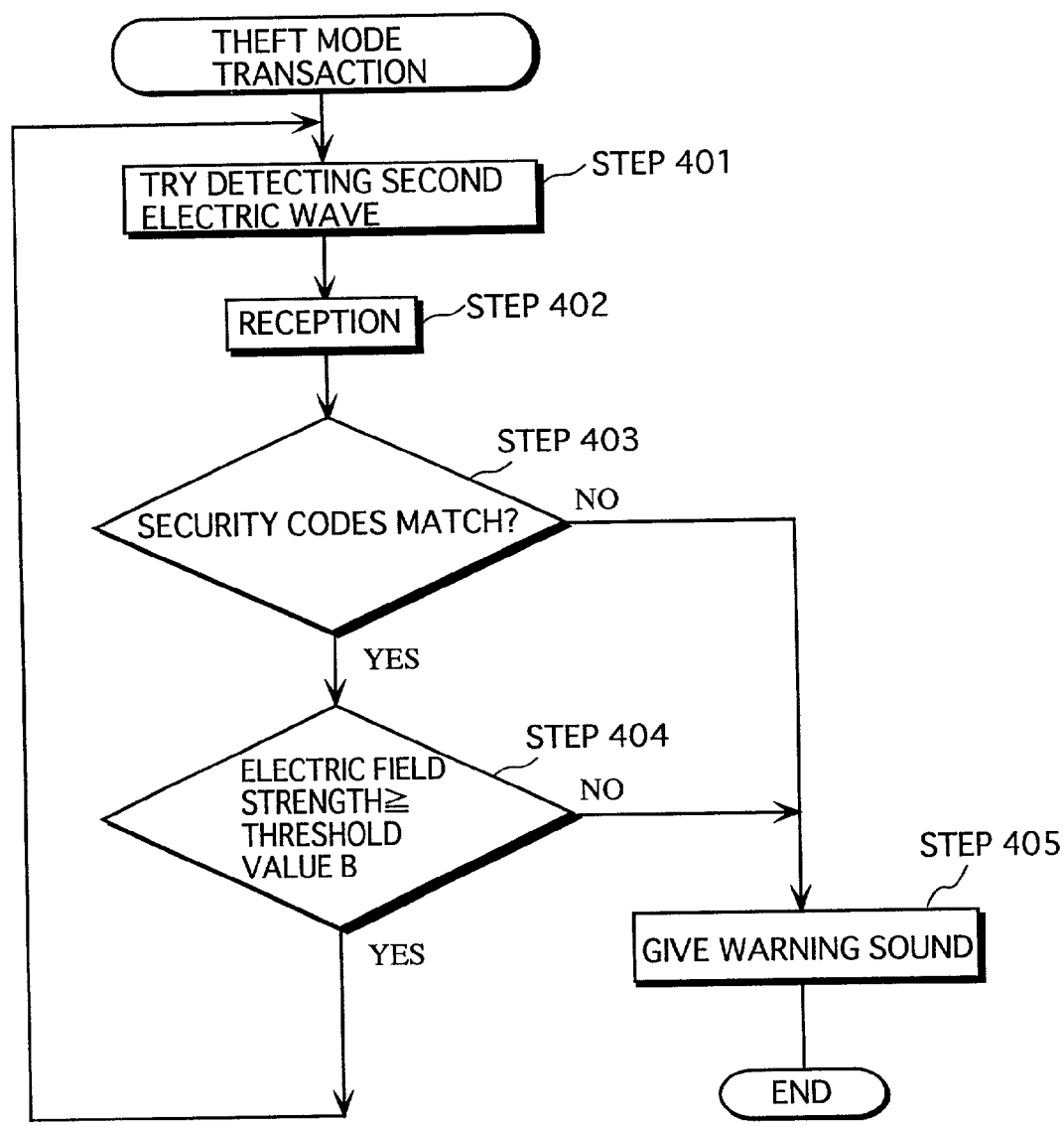

Next, the transaction performed by the control unit 14 is described, when only the theft mode is on. FIG. 8 is a flow chart showing the transaction performed by the control unit 14 in such a case. The steps S401–407 in FIG. 8 were already described with reference to FIG. 4, the description thereof is omitted accordingly. The transaction performed by the control unit 71 in this case is the same as the transaction performed by the control unit 14 (i.e. steps S401–S405) except that the transaction by the control unit 71 does not have step S406 and S407, the description thereof is omitted accordingly. Note that the following replacement is required for the transaction by the control unit 71: the reception unit 51 with the reception unit 62; the warning apparatus 21 with the mobile phone 20; the memory 11 with the memory 70; the speaker 9 with the speaker 67; the electric field strength measurement unit 52 with the electric field strength measurement unit 63; and the warning sound P with the warning sound R. FIG. 9 is a flow chart showing the transaction performed by the control unit 71, when only the theft mode is on. To facilitate understanding, the same step numbers are assigned for the control unit 71 as the corresponding step numbers used in the control unit 14 shown in FIG. 8.

Next, the transaction performed by a reception apparatus located at the security company which is one of the predetermined parties to receive the warning message and the position information in the steps S406 and S407 in FIG. 4 and FIG. 8 is described.

At the security company, a reception apparatus is located for receiving information sent from mobile phones owned by the users that have a contract with the security company (hereafter "reception apparatus"). Also placed at the security company are security staff for receiving instructions from the reception apparatus.

Figure 10:
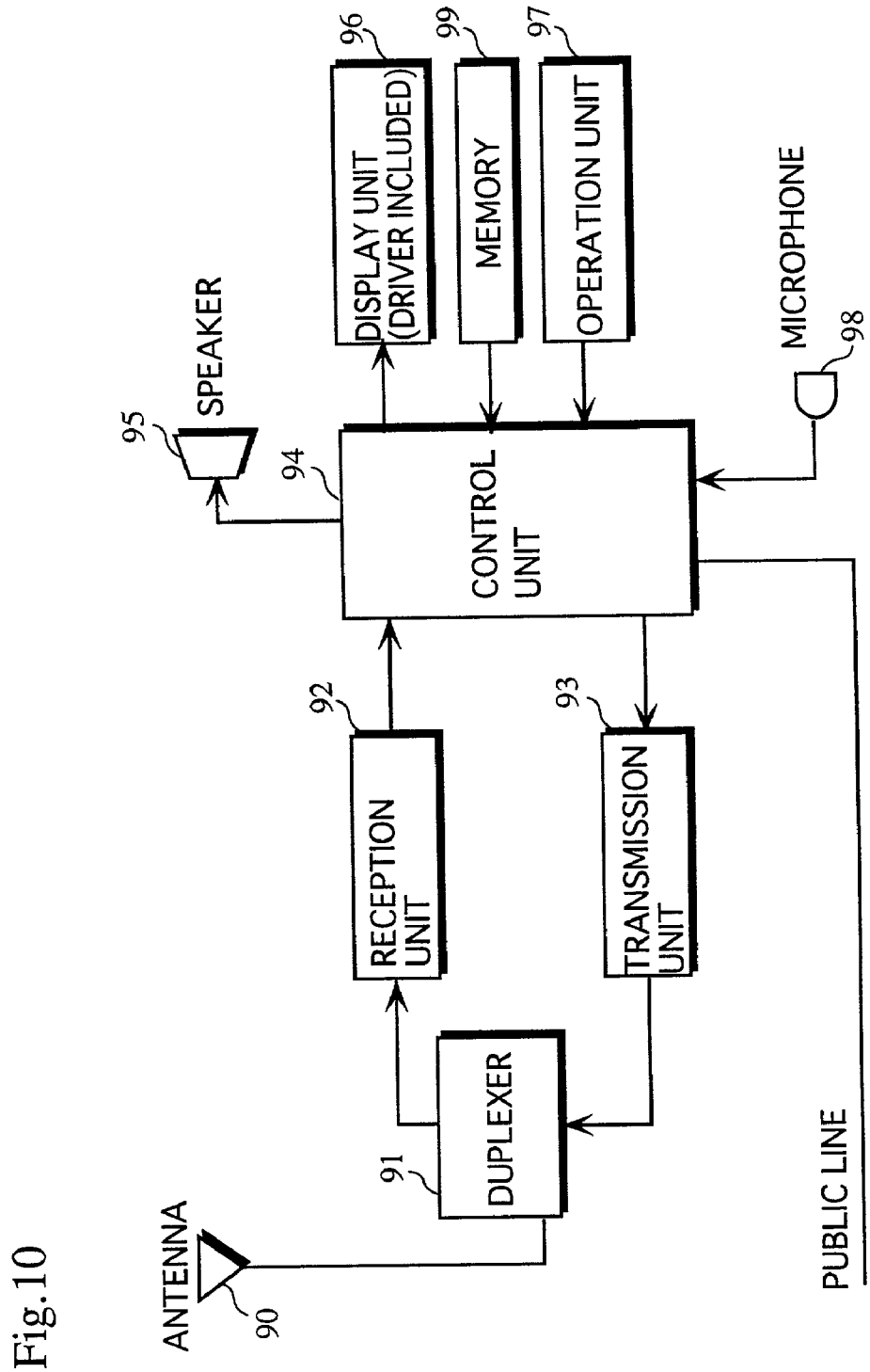
FIG. 10 is a block diagram showing a structure of the reception apparatus 10 located at the security company.

FIG. 10 is a block diagram showing a structure of the reception apparatus 80. The reception apparatus 80 includes an antenna 90, a duplexer 91, a reception unit 92, a transmission unit 93, a control unit 94, a speaker 95, a display unit 96, an operation unit 97, a microphone 98, and a memory 99.

The antenna 90 transmits and receives first electric waves. The duplexer 91 switches between transmission and reception for the antenna 90. The reception unit 92 demodulates, into data, first electric waves that are received through the antenna 90, and outputs the data to the control unit 94.

The transmission unit 93 modulates audio data outputted from the control unit 94 into audio signals, and outputs, through the duplexer 91, the audio signals to the antenna 90. The speaker 95 outputs the audio outputted from the control unit 94. The display unit 96, upon receiving an instruction from the control unit 94, displays characters and symbols and the like. The operation unit 97 receives a user instruction, and outputs the instruction to the control unit 94. The microphone 98 detects audio and outputs the detected audio to the control unit 94.

The memory 99 stores a table which includes a telephone number of the registered mobile phone and countermeasure data. FIG. 11A is an example table which is stored in the memory 99. The telephone number of the registered mobile phone in FIG. 11A is information about the telephone number for the mobile phone owned by users who have a contract with the security company. The countermeasure data consists of, for each mobile phone, information showing next actions to be taken when there is a notification of loss or theft, and the position information showing the current positions of the mobile phones. The position information is created by the control unit 94, upon receiving a notification of loss or theft, according to the position information notified by the mobile phone, and stored in the table of the memory 99. FIG. 11B is an example of the table which stores position information and which is stored in the memory 99. As FIG. 11B shows, the column labeled "position information" of the table includes information showing each phone's north latitude and east longitude information with the corresponding address information.

The control unit 94, upon receiving first electric wave data demodulated by the reception unit 92, identifies the telephone number of the mobile phone which sent the first electric wave, reads the table from the memory 99, judges whether the identified telephone number is included in the table. If it is included, the control unit 94 converts the audio message showing the position information sent from the mobile phone 20 into text data, and stores the text data in the table in correspondence with the identified telephone number.

The control unit 94, further reads the table from the memory 99, reads the identified telephone number, the countermeasure to be taken, and the position information, both in correspondence with the telephone number, from the table, converts them into an audio signal, and converts the audio signal into audio from the speaker 95, and either outputs as audio or displays on the display unit 96. By this operation, the security staff at the security company are able to know what action to be taken when they receive a notification from the mobile phones owned by the users who have a contract.

Seen from the above, in the embodiment of the present invention, when it has detected that the distance between the mobile phone and its warning apparatus is more than a certain amount of distance, by measuring the electric field strength of the second electric wave emitted from both of the mobile phone and the warning apparatus, a warning sound and the like is given. This enables users to recognize, without delay, the fact that their mobile phone or the warning apparatus is lost or stolen. Moreover, the users are further able to recognize whether the mobile phone is stolen or lost, according to the warning sound. In addition, in case of a theft, it becomes possible to get the position on the mobile phone from the GPS transaction unit 8, and to notify the predetermined parties of the detected position information so that countermeasures can be taken without delay.

This is the end of the embodiment of the present invention. The present invention is not confined to the embodiment which is described in the above.

For example, in the embodiment, it is designed to give a warning by giving a warning sound. However, it is also possible to be designed, instead of giving audio, to emit a light from the mobile phone or from the warning apparatus, or to vibrate the mobile phone or the warning apparatus, in the step S409 in the flow chart shown in FIGS. 4, 5, 6, and 7.

In addition, it is also possible to provide the mobile phone with a control to invalidate operation instructions. For example, instead of the step S405 in FIG. 4 and FIG. 8, it is possible to include a step to provide the mobile phone with the above control.

Figure 12:
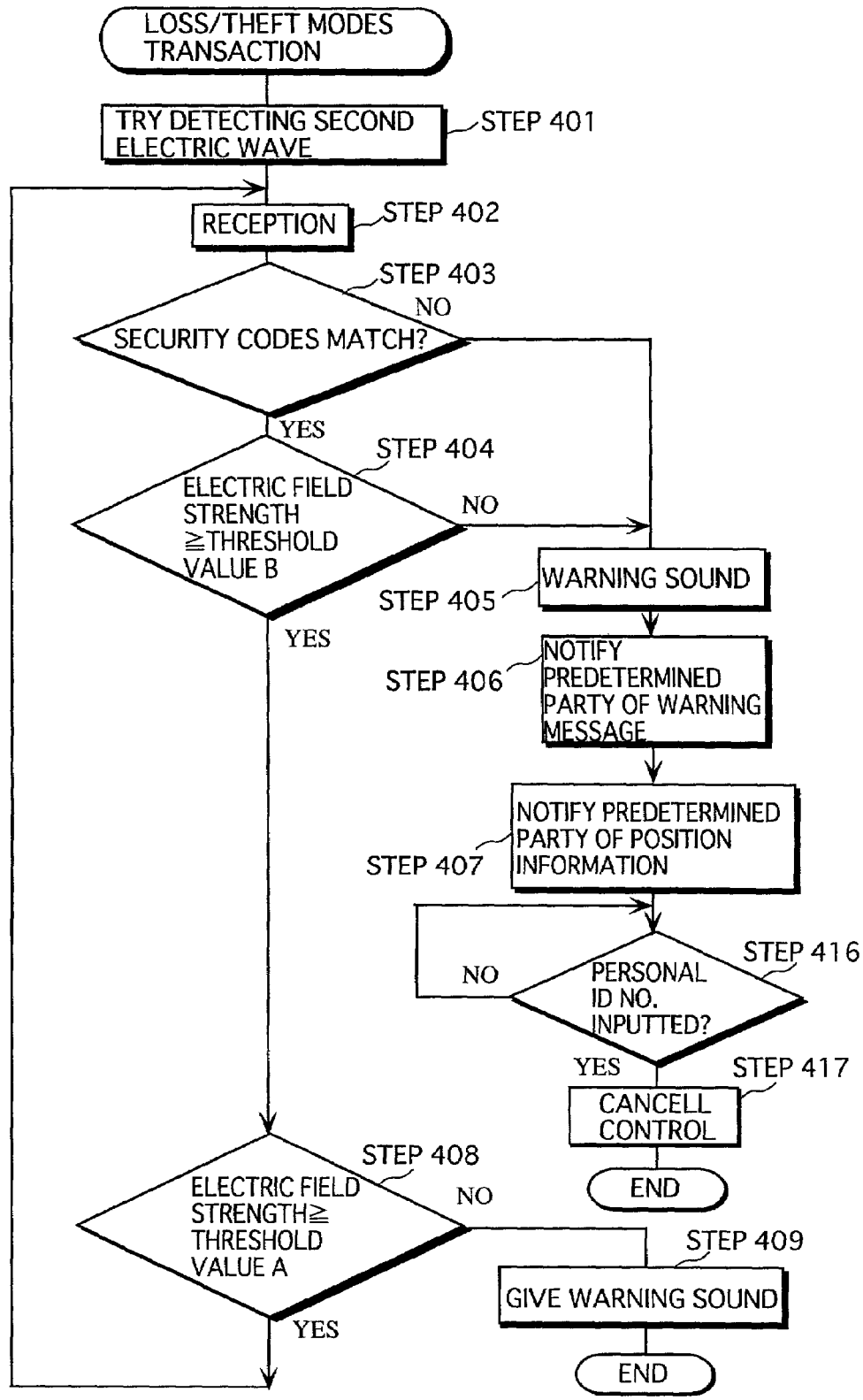
FIG. 12 is a flow chart showing the transaction performed by the control unit 14, when both the "loss" and the "theft" modes are on, and when the transaction for giving a warning sound is replaced with the transaction for providing a control to the mobile phone.
Figure 13:
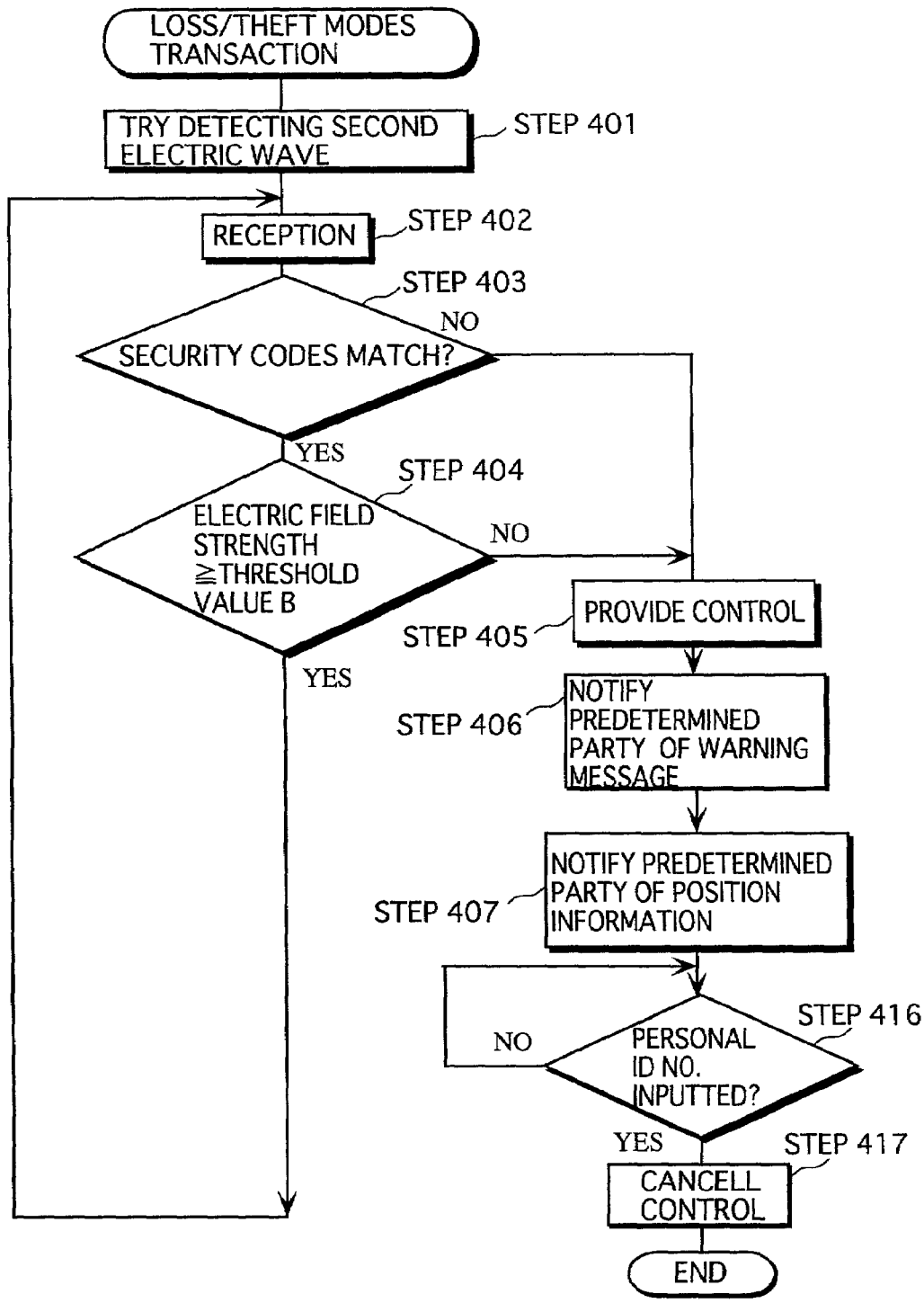
FIG. 13 is a flow chart showing the transaction performed by the control unit 14, when only the "theft" mode is on, and when the transaction for giving a warning sound is replaced with the transaction for providing a control to the mobile phone.

Specifically, the control unit 14 can be designed to provide a control to invalidate the operation instruction from a user until it gets input of the identification number stored in the memory 11. The flow chart in such a case is depicted in FIG. 12 and FIG. 13.

By this operation, users are able to prevent their mobile phones from being abused by a person who has found the phone, or by the robber. In addition, once their mobile phone is returned to the users, the users can input the identification number through the operation unit 12, remove the above control by inputting the identification number, in order to cancel the control over the mobile phone to retrieve the normal function again.

In addition, in the flow chart depicted in FIG. 4, when the two bit patterns do not match (step S403:N), the control unit 14 is designed to read the warning audio data P from the memory 11, to convert the data into an audio signal, and to output the audio signal to the speaker 9, and the speaker 9 is designed to convert the audio signal to the warning sound P, and to give a warning sound(step S405). However, it is also possible to be designed simply to go back to the step S401 without giving a warning sound.

Furthermore, in the embodiment described, the structure of the warning apparatus 21 is depicted in FIG. 2. However, other components can be optional for the warning apparatus 21 except an antenna 60, a duplexer 61, a reception unit 62, an electric field strength measurement unit 63, a transmission unit 64, a memory 70, and a control unit 71. Further, it is possible to add, to the structure shown in FIG. 2, an antenna for transmitting a first wave and a transmission unit. This addition enables the control unit 71 to notify position information of the warning apparatus 21 to predetermined parties, according to the position information outputted from the GPS transaction unit 66, in the same manner as the transaction performed by the control unit 14 (i.e. step s407) of the mobile phone 20 depicted in FIG. 4 and FIG. 8.

Further, in the channel code depicted in FIG. 3B, it is also possible to transmit, instead of second wave frequency data transmitted from the sender, second wave frequency data transmitted from the receiver.

Further, the bit patterns for the header and the security code depicted in FIG. 3C in the embodiment is only one example. The bit patterns are not confined to the embodiment example, and can be other bit patterns.

In addition, the step S406 shown in FIG. 4 and FIG. 8, it is designed to use an audio message acquired by the control unit 14 of the mobile phone 20 when notifying the predetermined parties. However, the message can also be given in the form of mail. In such a case, the control unit 14 reads out, from the memory 11, the mail address for the predetermined party, and warning message data, converts the acquired warning message data into text data, generates warning mail data by assigning the mail address and control data, transmits the generated warning mail data to the mail server that the mail address belongs to.

Furthermore, in step S407 shown in FIG. 4 and FIG. 8, it is designed for the control unit 14 of the mobile phone 20 to convert the acquired position information into audio, and transmits the audio to a predetermined party. However, the transmission of the position information can be performed in a form of a mail. In such a case, the control unit 14 reads the mail address of the predetermined party from the memory 11, generates mail data by assigning the mail address and control data to the position information outputted from the GPS transaction unit 8, and transmits the generated mail data to the mail server that the mail address belongs to.

In addition, in the embodiment, the second electric wave is designed to have a specific frequency. However, the frequency for the second electric wave can be, for example, about 2 MHz, or several GHz.

Furthermore, the warning sounds mentioned in step S405 and step S409 (see FIG. 4–FIG. 9) can be the same warning sound. In such a case, the memory 11 and the memory 70 are designed to store one and the same audio data. Each of the control unit 14 and the control unit 71 reads this audio data at step S405 and S409 respectively, thereby giving the same warning sound.

In addition, the memory 99 of the reception apparatus 80 in the present embodiment is also able to store a table which includes registered mail addresses showing the mail addresses of the mobile phones owned by the owners who have a contract, in which the correspondence is shown between the registered mobile phone numbers, the registered mail addresses, and the countermeasure data. From the above structure, the control unit 94, when the warning message and the position information are transmitted by mail to the reception apparatus, can identify the mail address of the mobile phone that sent the mail, reads out the table from the memory 99, judges whether the identified mail address is included in the table. When it is included, the control unit 94 further stores, in the table, the position information transmitted from the mobile phone 20 and the mail address in correspondence, reads out, from the table, the countermeasure data and the position information that are in correspondence with the identified mail address, converts them into an audio signal, converts the audio signal through the speaker 95 into audio, and either outputs the audio or displays on the display unit 96.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A mobile phone set including a mobile phone and a mobile warning apparatus,
    wherein the mobile warning apparatus transmits a specific electric wave addressed to the mobile phone,
    and the mobile phone comprises:
    storage means for storing contact information of a predetermined party including a mail address and a warning message;
    measuring means for measuring an electric field strength of the transmitted specific electric wave;
    judging means for judging whether the measured value of the electric field strength is smaller than a threshold value;
    acquiring means for acquiring position information showing a position of the mobile phone; and
    notifying means for notifying the predetermined party of the position information when the judging means judges that the measured value of the electric field strength is smaller than the threshold value,
    wherein the notifying means includes:
    mail generating means for reading the warning message, and generating first mail for informing the warning message, and second mail for informing the position information acquired by the acquiring means; and
    mail transmitting means for reading the mail address and transmitting, to the mail address, the first mail and the second mail.

2. The mobile phone set of claim 1,
    wherein the storage means stores a telephone number of a predetermined party,
    and the notifying means further includes:
    audio generating means for reading the warning message from the storage means, and generating audio data for the warning message and for the position information, according to the warning message and the position information acquired by the acquiring means;
    connecting means the connecting the predetermined party by reading out the telephone number from the storage means, and by calling the telephone number; and
    audio outputting means for outputting the audio data generated by the audio generating means.

3. The mobile phone set of claim 2,
    wherein the mobile phone further comprises:
    instruction receiving means for receiving an operation instruction from a user,
    and control providing means for providing a control to invalidate the operation instruction from the user, when the judging means judges that the measured value of the electric field strength is smaller than the threshold value.

4. The mobile phone set of claim 3,
    wherein the instruction receiving means further receives a personal identification number inputted by the user,
    and the control providing means includes
    a control canceling unit for canceling the control upon receiving the personal identification number.

5. The mobile phone set of claim 1,
    wherein the mobile phone further comprises:
    instruction receiving means for receiving an operation instruction from a user,
    and control providing means for providing a control to invalidate the operation instruction from the user, when the judging means judges that the measured value of the electric field strength is smaller than the threshold value.

6. The mobile phone set of claim 5
wherein the instruction receiving means further receives a personal identification number inputted by the user,
and the control providing means includes
a control canceling unit for canceling the control upon receiving the personal identification number.

7. A mobile phone which receives a specific electric wave transmitted from a mobile warning apparatus, comprising:
storage means for storing contact information of a predetermined party including a mail address of the predetermined party and a warning message;
measuring means for measuring an electric field strength of the transmitted specific electric wave;
judging means for judging whether the measured value of the electric field strength is smaller than a threshold value;
acquiring means for acquiring position information showing a position of the mobile phone; and
notifying means for notifying the predetermined party, when the judging means judges that the measured value of the electric field strength is smaller than the threshold value,
of the position information,
wherein the notifying means includes:
mail generating means for reading the warning message, and generating first mail for informing the warning message, and second mail for informing the position information acquired by the acquiring means;
mail transmitting means for reading the mail address and transmitting, to the mail address, the first mail and the second mail.

8. The mobile phone of claim 7,
wherein the storage means stores a telephone number of a predetermined party and a warning message,
and the notifying means includes:
audio generating means for reading the warning message from the storage means, and generating audio data for the warning message and for the position information, according to the warning message and the position information acquired by the acquiring means;
connecting means for connecting the predetermined party by reading out the telephone number from the storage means, and by calling the telephone number; and
audio outputting means for outputting the audio data generated by the audio generating means.

9. The mobile phone of claim 8,
wherein the mobile phone further comprises:
instruction receiving means for receiving an operation instruction from a user,
and control providing means for providing a control to invalidate the operation instruction from the user, when the judging means judges that the measured value of the electric field strength is smaller than the threshold value.

10. The mobile phone of claim 9,
wherein the instruction receiving means further receives a personal identification number inputted by the user,
and the control providing means includes
a control canceling unit for canceling the control upon receiving the personal identification number.

11. The mobile phone of claim 7,
wherein the mobile phone further comprises:
instruction receiving means for receiving an operation instruction from a user,
and control providing means for providing a control to invalidate the operation instruction from the user, when the judging means judges that the measured value of the electric field strength is smaller than the threshold value.

12. The mobile phone of claim 11,
wherein the instruction receiving means further receives a personal identification number inputted by the user,
and the control providing means includes
a control canceling unit for canceling the control upon receiving the personal identification number.

13. A mobile phone which receives a specific electric wave transmitted from a mobile warning apparatus, comprising:
storage means for storing contact information of a predetermined party;
instruction receiving means for receiving, from a user, a setting instruction for a first mode and a setting instruction for a second mode, each of the first and second modes having a threshold value for an electric field strength of the specific electric wave;
mode storage means for storing, in correspondence, a mode which is set to be on by the user and the threshold value,
measuring means for measuring the electric field strength for the specific electric wave;
first judging means for judging, when the first mode is set to be on, whether the measured value of the electric field strength is smaller than the threshold value for the first mode;
second judging means for judging, when the second mode is set to be on, whether the measured value of the electric field strength is smaller than the threshold value for the second mode;
notifying means for notifying the predetermined party when the first judging means judges that the measured value of the electric field strength is smaller than the threshold value; and
warning means for giving a warning when second judging means judges that the measured value of the electric field strength is smaller than the threshold value.

14. The mobile phone of claim 13, further comprising:
acquiring means for acquiring position information showing a position of the mobile phone;
wherein the notifying means notifies the predetermined party of the acquired position information by the acquiring means.

15. A mobile phone system comprising a reception apparatus located at a remote security company and the mobile phone which receives a specific electric wave and which is carried, by a user, with a mobile warning apparatus transmitting a specific electric wave to the mobile phone,
the mobile phone comprising:
measuring means for measuring an electric field strength of the specific electric wave;
judging means for judging whether the measured value of the electric field strength is smaller than the threshold value;
notifying means for notifying the reception apparatus, when the judging means judges that the measured value of the electric field strength is smaller than the threshold value, and
the reception apparatus comprising:
storage means for storing, in correspondence, identification data identifying one or more mobile phones registered in the security company in advance and countermeasure data showing a countermeasure to be executed for each mobile phone; and specifying means for specifying the identification data of the mobile phone upon receiving the notification from the mobile phone, and for specifying countermeasure data which corresponds to the mobile phone by referring to the correspondence between the identification data and the countermeasure data.

16. The mobile phone of claim 15, further comprising:

acquiring means for acquiring position information showing a position of the mobile phone;

wherein the notifying means notifies the predetermined party of the acquired position information by the acquiring means.

17. The mobile phone of claim 16, wherein the mobile phone further comprises:

instruction receiving means for receiving an operation instruction from a user, and control providing means for providing a control to invalidate the operation instruction from the user, when the judging means judges that the measured value of the electric field strength is smaller than the threshold value.

18. The mobile phone of claim 17, wherein the instruction receiving means further receives a personal identification number inputted by the user, and the control providing means includes a control canceling unit for canceling the control upon receiving the personal identification number.

19. A mobile phone which receives a specific electric wave transmitted from a mobile warning apparatus, comprising:

instruction receiving means for receiving, from a user, a setting instruction for a first mode and a setting instruction for a second mode, each of the first and second modes having a threshold value for an electric field strength of the specific electric wave;

mode storage means for storing, in correspondence, a mode which his set to be on by the user and the threshold value;

measuring means for measuring the electric field strength for the specific electric wave;

first judging means for judging, when the first mode is set to be on, whether a measured value of the electric field strength is smaller than the threshold value for the first mode;

second judging means for judging, when the second mode is set to be on, whether the measured value of the electric filed strength is smaller than the threshold value for the second mode; and notifying means for making a notification when the first judging means or the second judging means judges that the measured value of the electric field strength is smaller than the threshold value.

20. The mobile phone of claim 19 wherein, the notifying means makes a notification in the first manner when the first judging means judges that the measured value of the electric field strength is smaller than the threshold value, and makes a notification in a second manner when the second judging means judges that the measured value of the electric field strength is smaller than the threshold value.

* * * * *